(12) United States Patent
Karlsson et al.

(10) Patent No.: US 6,330,725 B1
(45) Date of Patent: Dec. 18, 2001

(54) VACUUM TOILET SYSTEM FOR A VEHICLE

(75) Inventors: Kent Karlsson, Poecking; Karl Kechele, Augsburg, both of (DE)

(73) Assignee: AOA Apparatebau Gauting GmbH, Gauting (DE)

( * ) Notice: Subject to any disclaimer, the term of this patent is extended or adjusted under 35 U.S.C. 154(b) by 0 days.

(21) Appl. No.: 09/744,347

(22) PCT Filed: Jul. 23, 1999

(86) PCT No.: PCT/EP99/05270

§ 371 Date: Jan. 23, 2001

§ 102(e) Date: Jan. 23, 2001

(87) PCT Pub. No.: WO00/07878

PCT Pub. Date: Feb. 17, 2000

(30) Foreign Application Priority Data

Jul. 31, 1998 (DE) .............................. 198 34 537

(51) Int. Cl.[7] .................................................. E03D 11/00
(52) U.S. Cl. ......................... 4/431; 4/316; 4/321; 4/432
(58) Field of Search ............................. 4/316, 321, 323, 4/431–433, 305, DIG. 3

(56) References Cited

U.S. PATENT DOCUMENTS

| | | |
|---|---|---|
| 4,184,506 * | 1/1980 | Varis et al. ............... 137/205 |
| 4,521,925 | 6/1985 | Chen et al. . |
| 5,214,807 | 6/1993 | Terve . |
| 6,006,373 * | 12/1999 | Hoang ......................... 4/431 |

FOREIGN PATENT DOCUMENTS 0 584 031 A    2/1994   (EP) .

* cited by examiner

Primary Examiner—Steven O. Douglas
Assistant Examiner—Tuan Nguyen
(74) Attorney, Agent, or Firm—Rosenman & Colin, LLP

(57) ABSTRACT

A vacuum toilet system for a vehicle, notably a passenger aircraft, comprising a plurality of toilets (1), a collecting tank (4), a duct system (3) which connects the toilets (1) with the collecting tank (4) via one flush valve (2) per toilet, a vacuum generator (5) which is connected to the collecting tank (4) in a fluidic manner, a flush water tank (8) and a flush water system (9), which connects the toilets (1) via one flush water valve (10) each and/or via a flush water pump with the flush water tank (8). A flush control (11) which acts on the flush valve (2) and the flush water valve (10) or flush water pump of the individual toilets (1) and can be actuated via an actuating means (12) assigned to the toilet. A standard flush program is stored in said control. The toilet system further provides for a centralized empty-flush control (14) which acts on the vacuum generator (5) and both the flush valves (2) and flush water valves (10) or flush water pump of all toilets (1) and when actuated causes an empty-flush program comprising at least one empty-flush cycle per toilet to run in all toilets.

10 Claims, 2 Drawing Sheets

VACUUM TOILET SYSTEM FOR A VEHICLE

Figure 1:
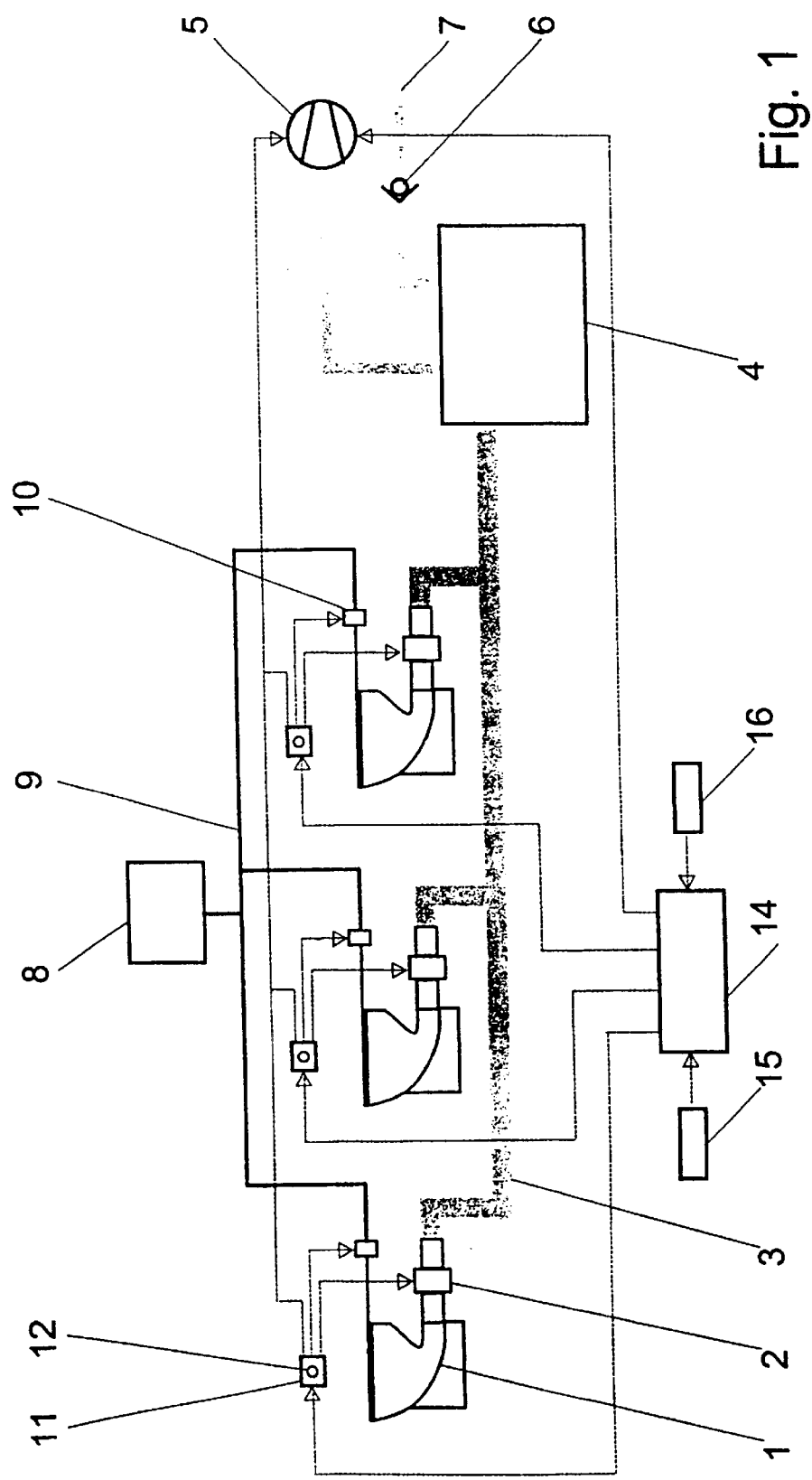

The present invention relates to a vacuum toilet system for a vehicle, and in particular for a passenger aircraft, comprising a plurality of toilets, a collecting tank, a conduit system, which connects the toilets with the collecting tank via one flush valve per toilet, a vacuum generator in fluid communication with the collecting tank, a flush water tank, and a flush water system connecting each one of the toilets via a corresponding flush water valve and/or via a flush water pump with the flush water tank. The invention provides a flush water control system, which acts on the flush valve and the flush water valve or flush water pump of the individual toilets and can be actuated by means of an actuating device associated with the corresponding toilet, and in which a standard flush program is stored.

Vacuum toilet systems of the above-mentioned type are known in various embodiments. They are disclosed, for example, in French patent publication FR-A-2,286,922, European patent publication EP-A-0,530,859 and U.S. Pat. No. 3,995,328. When vacuum toilet systems of this type are in operation in aircraft, a vacuum is generated in the collecting tank and in the conduit system when the aircraft is at cruising altitude, while the collecting tank remains open to the surrounding area by means of a vacuum break. When the aircraft is on the ground, or at lower flying altitudes (under 6,000 m), the vacuum generator ensures that the required vacuum is generated in the collecting tank and the conduit system for each single flush.

Vacuum toilet systems of this type usually entail unwelcome higher maintenance costs for the care and maintenance of the system. In this respect, two aspects are of particular significance. One the one hand, the diameter of the ducts in the conduit system may not exceed a specified dimension, in order to ensure adequate transportation of the material to be conveyed. On the other hand, deposits which have formed in correspondingly small cross sections of the interior walls of the ducts have a harmful effect on the transportation behavior. At the same time, it is also significant here that the specific material to be conveyed shows a marked tendency to cling to the interior walls of the ducts. Furthermore, it is in practice also important that, in the case of parked aircraft, the temperature frequently drops below the freezing point, which leads to the formation of ice in the conduit system.

Given the aforementioned disadvantages of the prior art, the invention is guided by the objective to develop a vacuum toilet system of the above-mentioned type which exhibits a high degree of reliability and operating safety at a comparably low maintenance cost.

In accordance with the invention, this objective is achieved by providing a centralized empty-flush control system controlling the vacuum generator, as well as the flush valves and flush water valves and flush water pumps of all toilets. When actuated, this empty-flush control system allows an empty-flush program, comprising all toilets, to flow through the conduit system with at least one empty-flush cycle per toilet. In accordance with the invention, the vacuum toilet system thus distinguishes itself from the prior art by a centralized empty-flush control which complements the flush control that acts on the individual toilets and after use allows a standard flush program to operate in these. In accordance with the invention, the centralized empty-flush program allows at least one empty-flush cycle to flow into all toilets of the vacuum toilet system, thus rendering possible a dramatic improvement in the discharge from the conduit system as against the prior art, with the result that there is a dramatic reduction in the formation of deposits in the conduit system and, in addition, in the case of parked aircraft, the risk of residual matter freezing in the conduit system is significantly reduced. In this connection, the vacuum toilet system offers the particular advantage that the empty-flush cycle can be distinguished from the standard flush program with regard to its distinctive flushing characteristics, and that, in addition, the empty-flush cycles that flow into the individual toilets and the location of the toilets concerned can be all be synchronized. Both of these aspects entail a further improvement of the desired result: this will be discussed in greater detail below.

The following description will discuss the invention in the context of flush water systems in which the flush water inflow is actuated in the standard flush program and in the empty-flush cycle or in the empty-flush systems by a flush water valve, which in each case is opened for a specified time. This does not entail any restriction by the invention on the operation of flush water systems of this type. Rather, the flush water inflow can be actuated as an alternative or in addition to a flush water pump allocated to each toilet, which in each individual case is operated for a specified time-period.

In accordance with the invention, the vacuum toilet system can be particularly advantageously used when at least some of the toilets have been designed to be flush mounted, in which the conduit system is at least partially configured at a higher level than the toilets. Since, in the case of flush-mounted toilets of this type, the conduit system is composed of central ducts in which, after the end of a standard flush program, a back flow takes place, with the result that that flush water and the material to be conveyed accumulate in significant amounts at the deepest point of the ascending pipeline, which can in turn lead to the formation of deposits and/or frozen residual matter (see above). In accordance with the invention, the empty-flush cycles, which are possible in the operation of the vacuum toilets system, and whose distinctive flushing characteristic is directed towards discharging as much matter as possible from the ascending pipelines, render it possible for the first time to operate low maintenance flush-mounted toilets. On the other hand, this is an essential economic aspect; for in this way the transportation capacity of passenger aircraft is significantly increased.

In connection with the invention, the data for the empty-flush systems to be implemented at the individual toilets can be stored in a centralized control unit. At the same time, it is possible to store an empty-flush unit in the centralized control unit which is synchronized for all toilets. Similarly, depending on the building specifications (floor-mounted or flush-mounted configuration; longer or shorter ascending ducts), it is possible to store different empty-flush cycles in the centralized control unit for the various toilets. In particular, when the empty-flush cycles of the individual toilets are different, the data of the respective empty-flush systems can also be stored in local control units. In such a case, the centralized empty-flush control is given priority over the local control units; it checks whether the necessary pre-conditions for the actuation (see below) have been met in each particular case and actuates the individual local control units in a pre-specified order, so as to initiate the empty-flush cycles in sequence.

A further preferred embodiment of the invention is characterized in that the empty-flush program per toilet comprises at least one empty-flush cycle, in which the ratio between the open period of the flush water valve and that of the flush valve is greater than in the standard flush program. This distinctive feature of the empty-flush program serves to optimize its efficiency at discharging the residual matter clinging to the interior walls of the ducts. This is especially the case if the vacuum toilet system comprises flush-mounted toilets communicating with ascending ducts.

Again, another preferred embodiment of the invention is characterized by the empty-flush program per toilet comprising a different distinctive flush feature. In this sense, it can especially be provided that the ratio between the open period of the flush water valve and that of the flush valve in the second empty-flush cycle is less than in the first cycle. The different distinctive flush features of the individual flush cycles in turn permit the best possible layout of the vacuum toilet system in accordance with the invention. The said distinctive flushing feature comes in especially useful if this comprises flush-mounted toilets, in which in the second flush cycle a greater ratio of air to flush water is interspersed, with a particular advantage for the complete discharge from the ascending ducts, including the removal of flush water.

In accordance with the invention, the vacuum toilet system works in a particularly efficient manner when the empty-flush cycles of the individual toilets take place both in sequence and in a pre-specified staggered manner. It is especially practical that the empty-flush cycles of two toilets overlap such that the flush water valve of one toilet is already open when the flush valve or, if applicable, the flush water valve of another toilet is still open. Such an overlapping fully exploits the vacuum generated by the vacuum generator. This is of considerable benefit with regard to the life expectancy of the vacuum generator, since it is generally not designed for continuous operation. The above-mentioned staggering of the empty-flush cycles of the individual toilets of the vacuum toilet system functions to minimize the operative duration of the vacuum generator for the complete operation of the empty-flush cycle. Overheating of the vacuum generator is thus avoided thereby increasing its life expectancy.

If, following the further embodiment explained above, the empty-flush system comprises two empty-flush systems per toilet, it is especially preferential that two empty-flush cycle sequences, each comprising all toilets, operate in sequence. This means that the empty-flush program comprises two empty-flush cycle programs, in which, in sequence, initially one and then subsequently a second empty-flush cycle flows through the conduit system. This further development of the invention seeks to optimize the efficiency of the discharge from the conduit system.

Within the framework of the present invention, the control of the empty-flush program, which is manually actuated by the centralized empty-flush control, also takes place fully automatically. In the course of this, for reasons of ease of operation, priority should be given here to the fully automatic initiation of the empty-flush program. In this sense, a further preferred embodiment of a toilet system installed in a passenger aircraft in accordance with the invention is that a floor contact sensor acts on the centralized empty-flush control, which emits the signal that initiates the empty-flush program. In such a case, the empty-flush of all toilets which are connected by the centralized empty-flush control to the vacuum toilet system is put into operation as soon as the landing gear of the aircraft concerned touches down on the landing runway, insofar as all otherwise provided safety requirements have been observed. For this purpose, a locking sensor, for example, could be incorporated into the conduit system, which would suppress the initiation of the empty-flush program, insofar as the entrance to the toilets has been locked. In this way, it can be guaranteed that the empty-flushing only then takes place when the entrance to the toilets has been locked by the in-flight personnel after checking that the toilets are no longer occupied.

For the sake of clarification, it should be noted that, within the scope of the invention, the vacuum system can also comprise several collection tanks and/or flush water supply containers. The claims should in no way be understood as indicating that only one container is provided for each toilet.

Figure 2:
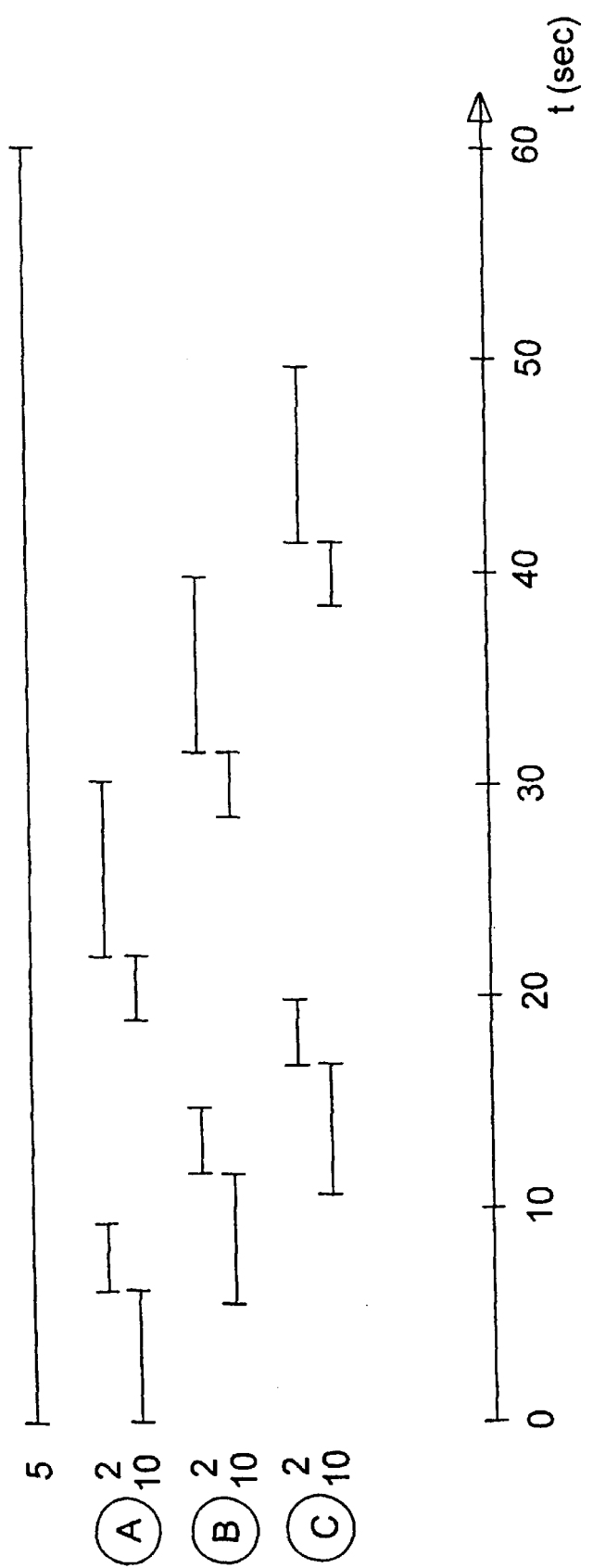

In the following section the present invention is decribed in greater detail with reference to the drawings, in which:

FIG. 1. shows a diagrammatic representation of a preferred embodiment of a vacuum system in accordance with the present invention; and FIG. 2 illustrates an empty-flush program in operation in the vacuum toilet system of FIG. 1.

The vacuum toilet system illustrated in FIG. 1 comprises three toilets 1, which are each connected via flush valve 2 to the conduit system 3, which discharges into the collecting tank. A vacuum generator 5 has been provided in order to generate a vacuum in the collection tank 4 and in the conduit system 3. In addition, a vacuum break 7 discharges into the open air via a vacuum conduit 6. In the case of sufficiently high flight altitudes, the vacuum in the collection tank 4 is provided exclusively by the vacuum conduct that discharges into the ambient.

A flush water system comprises a flush water supply tank 8, a flush water mains and one flush water valve per toilet 10. As an alternative or in addition to the flush water valves 10 one flush water pump per toilet could also be provided (see above).

Each toilet is provided with a flush control 11 with a release switch 12. If the release switch 12 is actuated, the standard flush program stored in the flush control flows through the toilet, firstly by the opening of the flush water valve 10 and then subsequently by the opening of the flush valve 2 of the toilets. The open period of the flush water valve in the standard flush program thus amounts to approx. 1.5 sec., which corresponds to an amount of flush water of approx. 0.2 liters. The open period of the flush valve 2, which is opened as soon as possible after the closure of the flush water valve 10, amounts to about 4 seconds. In order to ensure that it is still possible to flush the toilets even when the aircraft is at low flight altitudes or is on the ground, the flush control also acts on the vacuum generator 5 at lower flight altitudes or when on the ground and switches this on at the beginning of the standard flush program.

Within the framework of the above-mentioned description, the vacuum toilet system illustrated in FIG. 1 corresponds adequately to the known prior art. To this extent more detailed explanations will be dispensed with here.

In order to implement the empty-flush program, the vacuum toilet system of FIG. 1 comprises a centralized empty-flush control 14, which acts on the flush controls 11 that are allocated to the individual toilets 1, so that in order to allow a specific empty-flush program to flow through the conduit system, the flush valves 2 and the flush water valves 10 of the individual toilets are defined as opened and closed. In addition, the centralized empty-flush control acts on the vacuum generator 5; which is switched on for the operation of the empty-flush program, The opening and closing behav ior of the individual flush valves and flush water valves 2 and 10 for the empty-flush program is stored in the flush controls 11. The centralized empty-flush cycle 14 simply signals the beginning of the empty-flush cycle in each individual toilet. This means that the flush systems allocated to the individual toilets 1 are triggered by the centralized empty-flush control 14 in order to initiate the respective locally stored empty-flush cycle.

The empty-flush program composed of the individual empty-flush cycles is automatically actuated after the landing of the aircraft. In addition, a floor contact sensor 15 acts on the centralized empty-flush control 14, which emits a signal as soon as the aircraft has touched down on the landing strip. A further security measure here is provided by a locking sensor 16, which signals the blocking of the access to the toilets.

FIG. 2 provides an exemplary illustration of an empty-flush program for the vacuum toilet system comprising three toilets represented in FIG. 1. The empty-flush program comprises two empty-flush cycle sequences, which operate in sequence. Each empty-flush sequence comprises an empty-flush cycle for each of the three toilets A, B and C, and is in turn composed of a defined opening of the flush water valve 10 and a defined opening of the flush valve 2. Within the framework of the first empty-flush cycle sequence, the flush water valve of each toilet is opened for 6 seconds, so that about 700 g of water flows into the toilets. After the closure of the flush water valve 10, the flush valve 2 is opened for 3 seconds. The objective of this empty-flush cycle is to remove as much of the deposit attack as possible from the interior walls of the ducts.

A fundamentally different flush characteristic becomes apparent during the second empty-flush cycle sequence. In this, the flush water valve 10 is opened for 3 seconds for each empty-flush cycle, whereas the flush valve 2 is then opened for a period of approx. 8 sec. The objective of the second cycle is a complete discharge from the ascending ducts.

In this course, however, it should be noted that the empty-flush program illustrated in FIG. 2 is geared to the vacuum toilet system, in which the toilets are configured as floor-mounted toilets, in which the empty-flushing is here specially designed to achieve as great as possible discharge from the ascending ducts of the conduit system. In the case that the toilets are configured in a different manner, a divergent, distinctive synchronized characteristic of the empty-flush cycles is advisable.

The overlapping of the empty-flush cycles of the individual toilets inside of the empty-flush cycle sequences succeeds in minimizing the need to switch on the vacuum generator 5 in the duty cycle at the beginning of the empty-flush cycle. Quite obviously, less than 60 seconds are required for the whole empty cycle program comprising two empty-flush cycle sequences, including a return of the water serving to cool the vacuum generator which lasts ten seconds. This is therefore an especially efficient use of the vacuum generator, which sustains no breakdown throughout a serviceable life of the length indicated.

For the sake of completion, it should be made clear that the empty-flush program sketched in FIG. 2 can also be stored directly in the centralized empty-flush control 14 (cf. FIG. 1). In such a case, the centralized empty-flush control does not act on the flush controls 11, but rather directly on the flush valve 2 and the flush water valve 10 of the individual toilets.

What is claimed is:

1. A vacuum toilet system for a vehicle, especially a passenger aircraft, the toilet system comprising:

a plurality of toilets, a collecting tank, a conduit system connecting the plurality of toilets to the collecting tank via a flush valve per each individual toilet, a vacuum generator is fluidly connected to the collecting tank, a flush water tank connecting to the plurality of toilets via a flush water system having a flush water valve or a flush water pump per the individual toilet;

the vacuum toilet system comprises a flush water control which acts on the flush valve and the flush water valve or the flush water pump of the individual toilet, the flush water control includes an actuating device and a standard flush program stored therein for flushing the individual toilet;

the toilet system further comprises a central empty-flush control which acts on the vacuum generator, the flush valve and the flush water valve or the flush water pump of all toilets, wherein the central empty-flush control includes an empty-flush program per the individual toilet, the empty-flush program having at least one empty-flush cycle for allowing flush water of the toilets to flow through the conduit system and into the collection tank when the empty-flush control is actuated.

2. The vacuum toilet system of claim 1, wherein said empty-flush program for said at least one empty-flush cycle for all individual toilet is stored in said central empty-flush control.

3. The vacuum toilet system of claim 1, wherein the ratio of the open period of the flush water valve or of the cycle of the flush water pump to that of the open period of the flush valve of the at least one empty-flush cycle of the empty-flush program is greater than that of the standard flush program.

4. The vacuum toilet system of claim 1, wherein the empty-flush program per the individual toilet comprising two empty-flush cycles with different flushing characteristics.

5. The vacuum toilet system of claim 4, wherein the ratio of the open period of the flush water valve or of the cycle of the flush water pump to that of the open period of the flush valve is lower during the second empty-flush cycle than during the first empty-flush cycle.

6. The vacuum toilet system of claim 1, wherein the at least one empty-flush cycle of the individual toilets overlap one another.

7. The vacuum toilet system of claim 1, wherein two empty-flush cycle sequences exist in all toilets.

8. The vacuum toilet system of claim 1, wherein at least one part of the conduit system is being arranged partially at a higher level than at least one part of the plurality of toilets.

9. The vacuum toilet system of claim 1, wherein a floor contact sensor emits a signal to initiate the empty-flush program of the central empty-flush control.

10. The vacuum toilet system of claim 1, wherein at least one locking sensor in communication with the central empty-flush control suppresses the empty-flush program when the entrance to the plurality toilets is not locked.

* * * * *